Figures 1, 2:
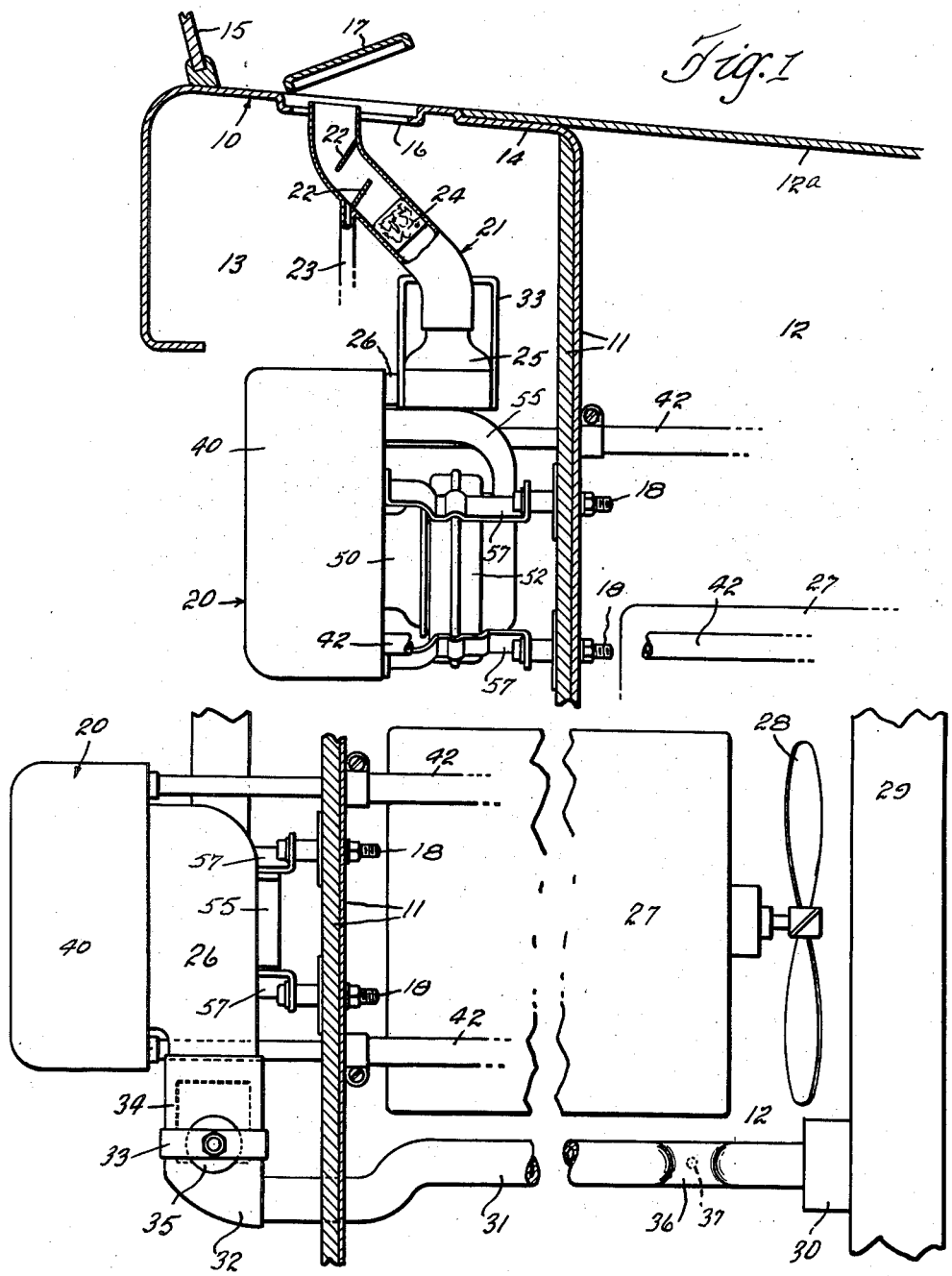

Dec. 19, 1939.  E. L. MAYO  2,183,996
HEATING AND VENTILATING SYSTEM
Filed Dec. 13, 1937  6 Sheets-Sheet 1

E. L. Mayo
INVENTOR.

BY Hull Brock, & West
ATTORNEY.

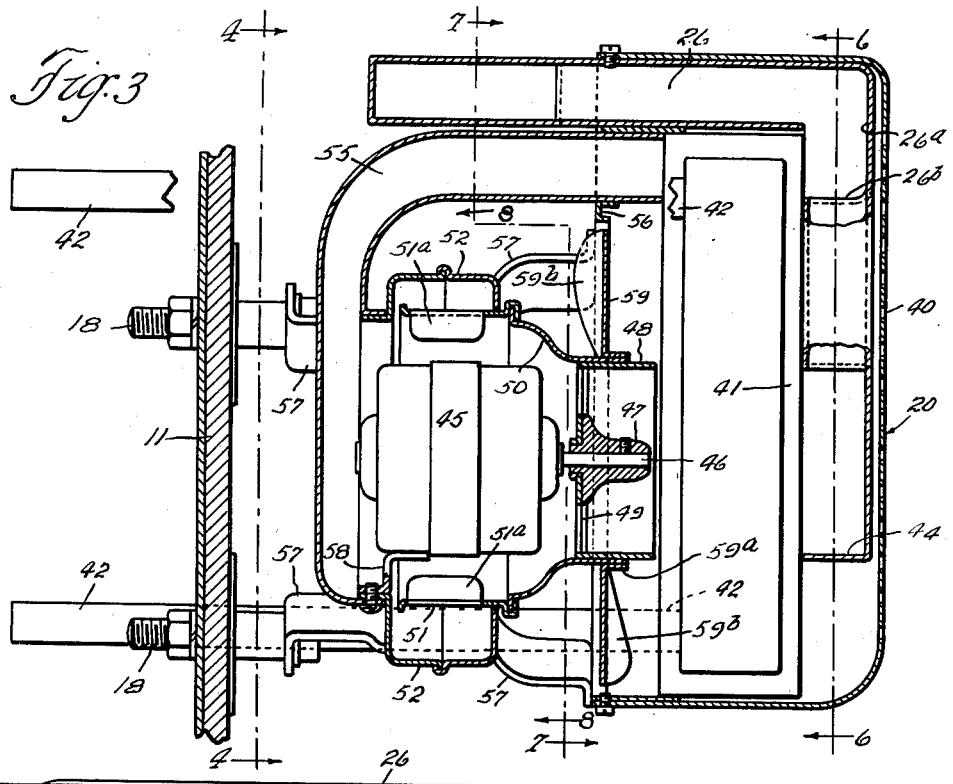
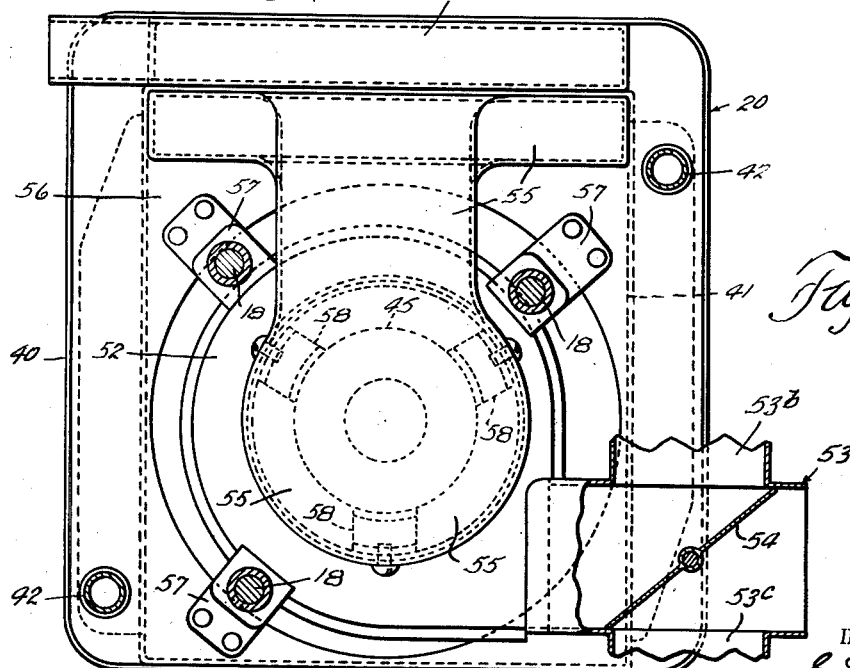

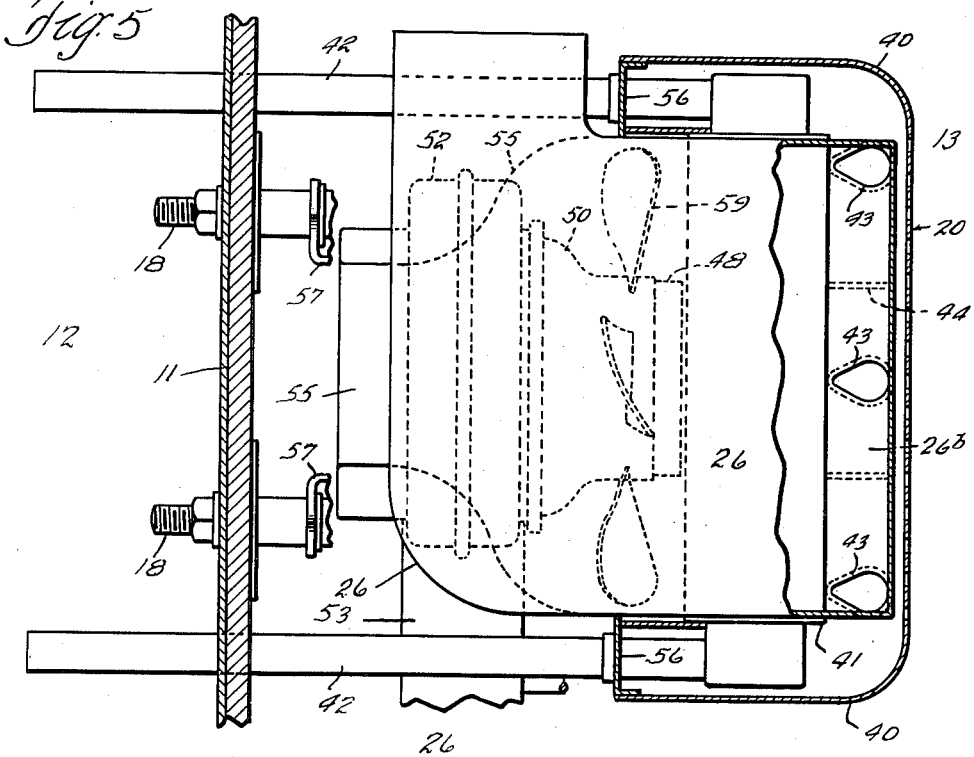
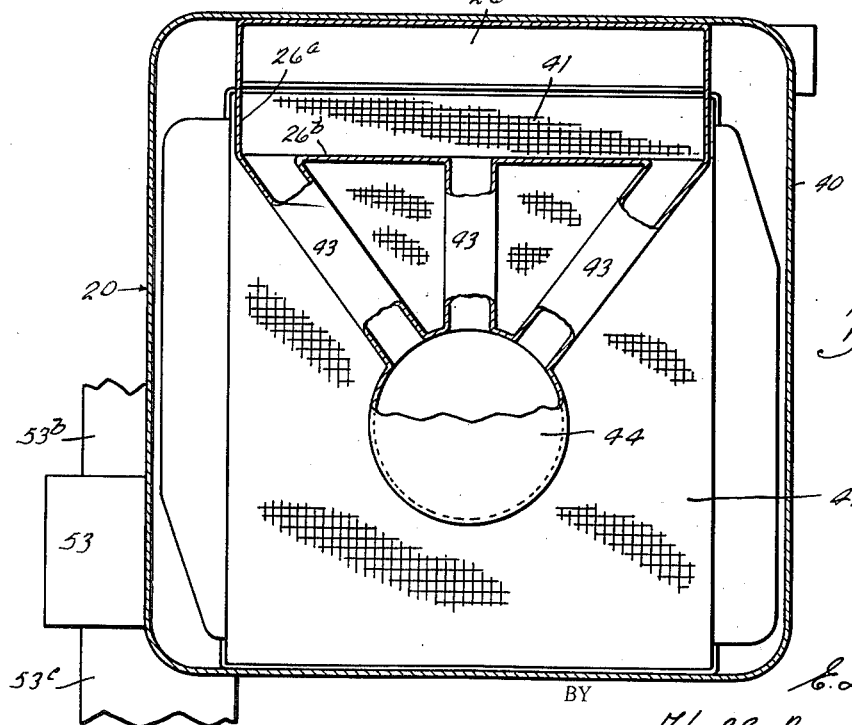

Dec. 19, 1939.　　　　E. L. MAYO　　　　2,183,996
HEATING AND VENTILATING SYSTEM
Filed Dec. 13, 1937　　　6 Sheets-Sheet 4
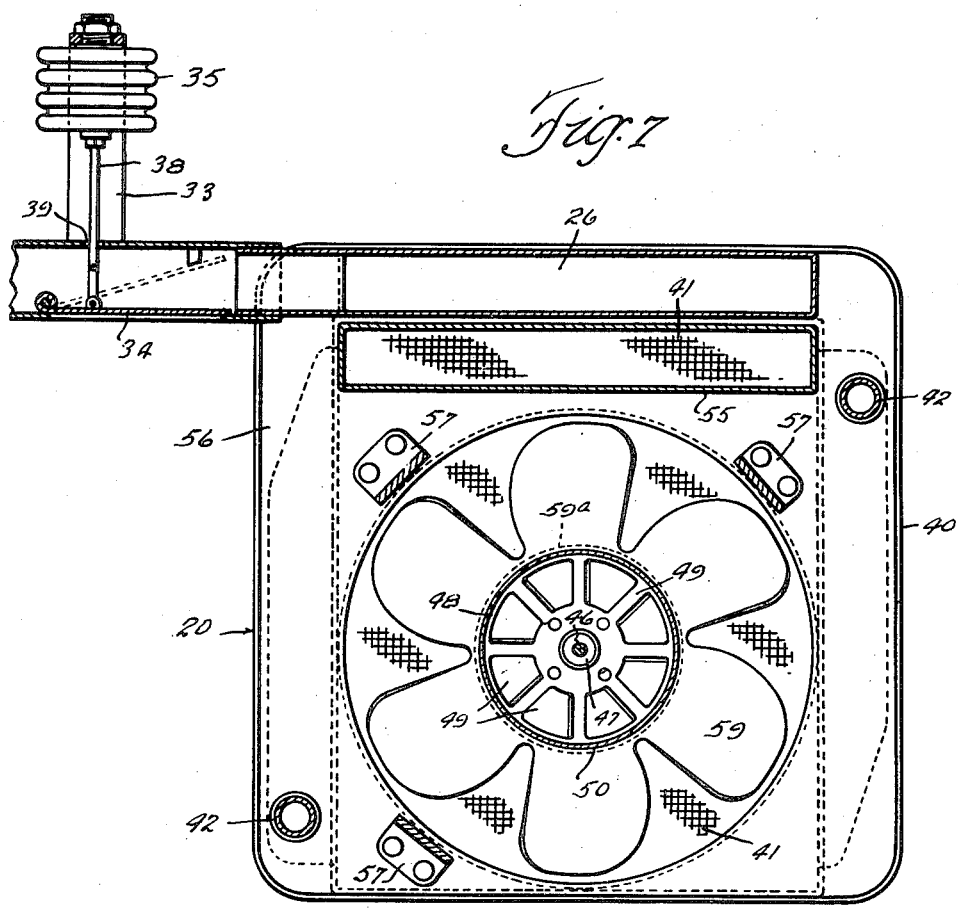
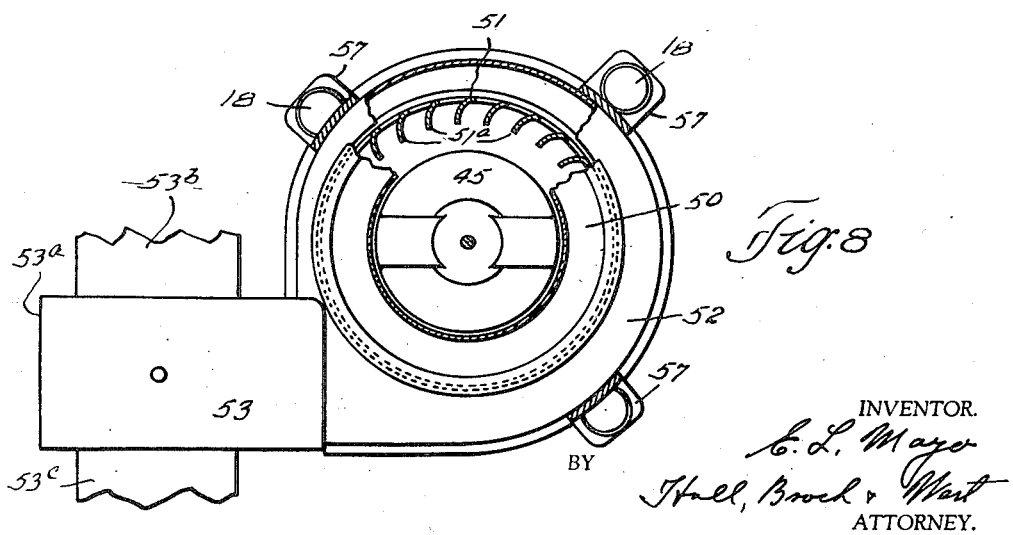
INVENTOR.
E. L. Mayo
BY Hall, Brock & Wart
ATTORNEY.

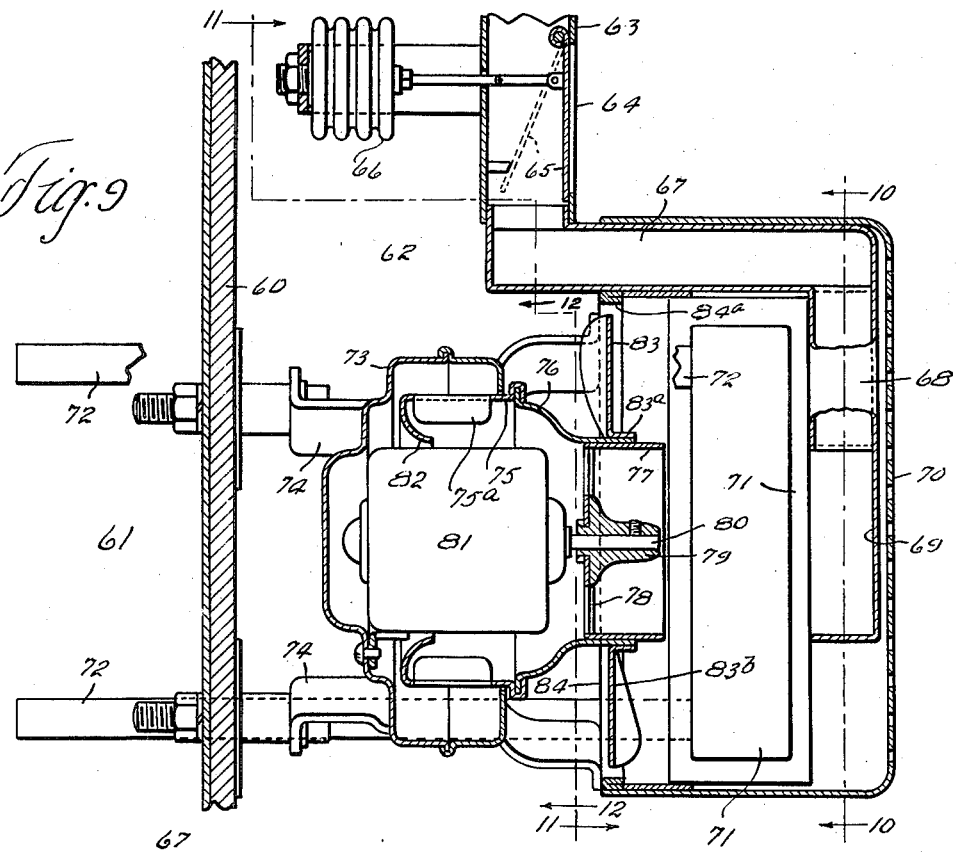

Dec. 19, 1939.  E. L. MAYO  2,183,996
HEATING AND VENTILATING SYSTEM
Filed Dec. 13, 1937  6 Sheets—Sheet 6
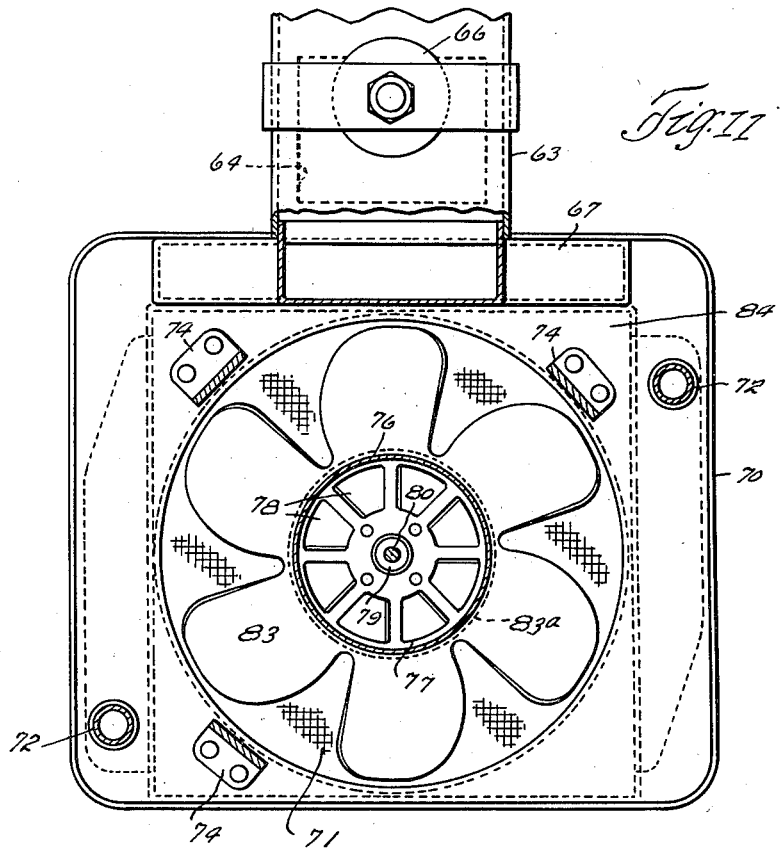
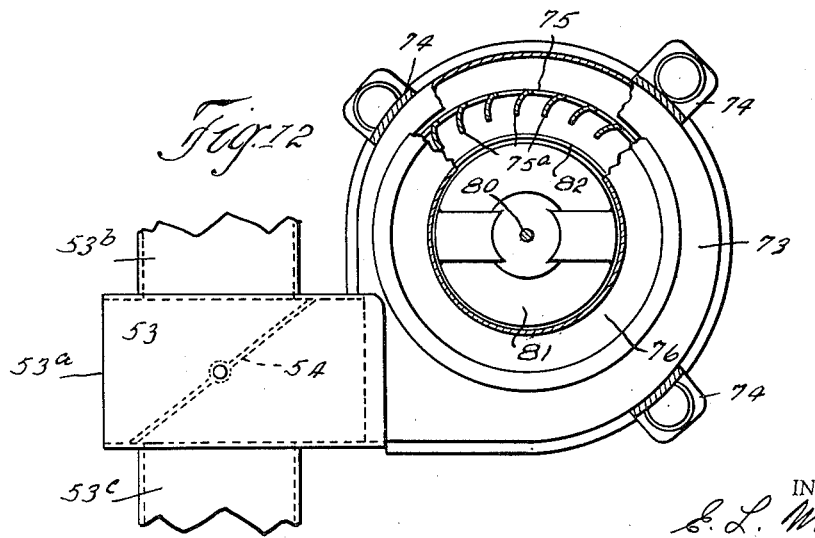
INVENTOR.
E. L. Mayo
BY Hall, Brock & West
ATTORNEY.

Patented Dec. 19, 1939

2,183,996

UNITED STATES PATENT OFFICE 2,183,996

HEATING AND VENTILATING SYSTEM

Edward L. Mayo, Cleveland, Ohio, assignor to The Bishop & Babcock Manufacturing Company, Cleveland, Ohio, a corporation of Ohio Application December 13, 1937, Serial No. 179,447

6 Claims. (Cl. 257—137)

This invention relates to an air conditioning device designed especially for use in connection with the passenger compartments of motor vehicles but useful in other analogous situations.

The principal object of the invention is to provide a satisfactory device of this kind capable of delivering heated fresh air from the outside to the inside of the passenger compartment of the vehicle and at the same time to re-circulate the main body of air within the said compartment.

A further object is to provide for thermostatic regulation of the amount of fresh air admitted to the passenger compartment responsive to the temperature therein.

A further object is to make use of the motion of the vehicle as an auxiliary air circulating means.

A still further object is to provide novel and effective means for circulating the air in relation to the radiator or other heat exchanging device and the air circulating mechanism whereby a relatively simple and inexpensive device is provided for securing the above objects and one which will not get out of order and which will require a minimum of attention.

With the foregoing and other and more limited objects in view, which will be partly apparent and partly pointed out hereinafter, the invention consists in various features of construction and combinations of parts as hereinafter described and illustrated in the accompanying drawings wherein Fig. 1 is a diagrammatic view showing a fragment of a motor vehicle with an air conditioning device according to the invention installed; Fig. 2 is a similar diagram showing a different means of supplying fresh air and showing the common structure in plan; Fig. 3 is a central vertical section of either of the devices shown in Figs. 1 and 2, the fresh air ducts and most of the motor vehicle being omitted; Fig. 4 is a section corresponding substantially to the line 4—4 of Fig. 3; Fig. 5 is a plan view of the device shown in Fig. 3, with parts in section; Fig. 6 is a section corresponding substantially to the line 6—6 of Fig. 3; Fig. 7 is a section corresponding substantially to the line 7—7 of Fig. 3; Fig. 8 is a section corresponding substantially to the line 8—8 of Fig. 3, parts being broken away to show the construction of the centrifugal fan, and most of the conduit structure being omitted; Fig. 9 is a view similar to Fig. 3 but showing a modified form of the invention wherein the conduit which conducts air to the end of the centrifugal fan most remote from the radiator is omitted and a somewhat different form of fresh air duct is employed;

Fig. 10 is a section on the line 10—10 of Fig. 9; Fig. 11 is a section corresponding substantially to the line 11—11 of Fig. 9, and Fig. 12 is a view similar to Fig. 8 and corresponding substantially to the line 12—12 of Fig. 9.

Referring first to Fig. 1, the numeral 10 indicates a portion of a conventional automobile having the usual partition 11 dividing the body thereof into a motor compartment 12 and a passenger compartment 13. The hood cover 12a rests on a shouldered portion 14 of the element 10. The element 10 supports a conventional windshield 15 and is provided with the usual ventilation opening 16 having a cover 17. Mounted on the partition 11 by means of suitable bolts 18 is the heating unit indicated generally by the reference character 20. Communicating with the heater 20 is a fresh air duct indicated generally by the numeral 21. This duct extends upwardly and terminates under the closure 17. This duct is provided with suitable baffles 22 immediately above the lowermost of which is a drain 23. Immediately below the baffles 22 is a filter 24. The duct 21 communicates at its lower end with an adaptor 25 which delivers air to a horizontal element 26 which in turn delivers air to the heater 20.

Referring now to Fig. 2, which, although a modified form, differs only in the construction of the fresh air duct, and constitutes a plan view of the common structure, it will be seen that within the motor compartment 12 there is located a motor 27 provided with the usual cooling fan 28 and water cooling radiator 29. Positioned adjacent the radiator 29 is the forwardmost portion of a fresh air inlet comprising an enlarged intake element 30 which may contain a filter, a conduit 31 and an adaptor 32. The adaptors 25 and 32 are substantially similar, although not necessarily identical. Attached to each of these adaptors and extending upwardly therefrom are inverted U-shaped supporting elements 33 below which are closures 34 cooperating with suitable openings in the bottom walls of these adaptor elements. Interposed between the closures 34 and the bight portions of the elements 33 are thermostatic operating elements 35 (not seen in Fig. 1). A trap 36 is provided in the conduit 31 at the bottom of which is a drain opening 37 for accumulated moisture.

It will be obvious that in both cases the motion of the vehicle will tend to create pressure forcing air through the fresh air ducts to the heater 20, that filtering means may be provided for preventing ingress of foreign material to the passenger compartment. It will be noted also that when the closure 34 is opened, for example, to the position shown in dotted lines in Fig. 7, air from the passenger compartment may enter the element 26. It will be noted also that the thermostatic element 35 which operates the closure 34 through an operating rod 38 working in a slot 39 is exposed to the temperature in the passenger compartment. Consequently the admission of fresh air to the passenger compartment is thermostatically controlled responsive to the temperature in such compartment. The temperature in the passenger compartment may therefore be automatically maintained substantially constant.

Within the outer shell 40 of the heater 20 is a radiator 41 which may be of the hot water type, although other heating means may be employed within the scope of the invention. If the heater 41 is of the hot water type, it may be supplied with hot water from the engine cooling circuit through the pipes 42. The element 26 passes beneath the shell 40 at the top of the heater 20 and has one wall turned downwardly and inwardly, as indicated at 26a and 26b whereby fresh air entering therethrough is caused to pass in contact with the upper edge of the radiator 41. Extending downwardly from the wall 26b are tubular elements 43 which in cross section are streamlined as best seen in Fig. 5. The tubes 43 communicate with an outlet 44 which may be cup-shaped, as indicated in Figs. 3 and 6. It will be noted that the element 44, like that 26, opens adjacent the radiator 41. By reason of the streamlined shape of the tubes 43, they reduce resistance to passage of air from the passenger compartment past such pipes 43 and through the radiator 41.

A motor 45 which may be electrically or otherwise driven has attached to its power shaft 46 a fitting 47 carrying a cup-shaped sleeve element 48 provided with openings 49 for the passage of air. Telescoped with the element 48 is a sheet metal flaring sleeve element 50 which carries the rotor 51 of a centrifugal type fan, the same being provided with struck out vane elements 51a. The motor power shaft 46 and the elements 47, 48, 50 and 51 rotate as a unit. It will be noted that the sleeve element 48 terminates adjacent the radiator 41 and opposite, that is, in register, with the fresh air inlet element 44. Surrounding the element 51 is a fixed element 52 forming the housing for the fan motor 45. The housing 52 delivers to a fitting 53 having a horizontal outlet 53a and upwardly extending outlet 53b and downwardly extending outlet 53c. Passage of air to these various outlets is controlled by a butterfly 54 which, as indicated in Fig. 4, will cause air to flow through the outlet 53b, which may be moved to a position substantially 90° to that shown in Fig. 4 for the purpose of diverting all the air through the outlet 53c and which may occupy an intermediate position, allowing air to flow principally through the outlet 53a and to a slight extent through the other outlets.

Attached to and communicating with the fixed housing element 52 is a conduit 55 which extends upwardly and toward the radiator 20, terminating opposite or in registration with the outlet from the duct element 26. The housing element 52 may be supported on an element 56 by means of brackets 57 while the motor 45 may be supported by means of a bracket 58 secured to the housing 52 and a portion of the conduit 55.

Supported on the sleeve element 50 is a propeller type fan 59 preferably comprising a sheet metal plate having a flange 59a and outturned edges 59b.

When the motor 45 is running, the air will be drawn, by the rotor 51 working in the motor housing 52, through the conduit 55 and the sleeve 48. These will cause fresh air from the duct 21 to pass the radiator 41 from the fresh air inlet openings 26 and 44 and be delivered by the centrifugal fan through one of the outlets in the element 53 at the same time air will be re-circulated from one portion of the passenger compartment to the other by the fan 59. It will be noted that the fan delivers to different parts of the passenger compartment. For example, the outlets from the element 53 may pass the air to the rear of the passenger compartment, to the windshield or be directed toward the driver's feet. The re-circulation produced by the fan 59 will be directed into the passenger compartment in the usual way. The passenger compartment may be provided with an opening to relieve the pressure in case the enclosure is sufficiently complete to render that precaution necessary. Usually there will be sufficient leakage to avoid the necessity for this provision.

Referring now to the modified form of the invention illustrated in Figs. 9 to 12 inclusive, it will be seen that a partition 60 is provided corresponding to the partition 11 of Fig. 1, dividing the vehicle body into a motor compartment 61 and a passenger compartment 62. The fresh air duct may be, for example, of the type shown in Fig. 1 terminating in a conduit portion 63 provided with an opening 64 having a closure 65 operated by thermostatic element 66 similar to the thermostatic element 35 and similarly related to the fresh air duct. The lower end of the duct 63 joins an intake element 67 which terminates in a plurality of tubes 68 communicating with an inlet 69 similar to the inlet 44. The elements 68 and 69 are housed within the outer shell 70 and open adjacent the center of a radiator 71 supplied with hot water or other heating fluid through pipes 72. An outer fan housing 73 is carried by suitable brackets 74 secured to the partition 60. Within the housing 73 is a rotatable centrifugal fan element 75 carried by a sleeve 76 in turn supported by a cup shaped element 77 provided with openings 78 for the passage of air therethrough. The cup-shaped element 77 is carried by a fitting 79 supported on the power shaft 80 of a motor 81. It will be noted that the element 75 carries struck out vanes 75a and terminates in an inturned flange 82. It will be noted that the cup-shaped element 77 terminates opposite the fresh air inlet 69, that is, in registration therewith. As in the case of the previous modification, the inlet element 67 corresponding to the element 26 passes under the upper edge of the heater 70 and downwardly in front of the radiator 71. Carried by the sleeve 76 is a propeller type fan 83 having outturned edges 83a and 83b. In view of the spacing of the shell away from the radiator for accommodation of the pipes 72 (42 in the first described form), it is desirable to provide an element 84 surrounding the heater and having flanges 84a extending outwardly approximately to the shell 70.

From the foregoing, it will be clear that the form illustrated in Figs. 9 to 12 inclusive operates like the previously described form with the exception that the intake to the centrifugal fan is from one end only, namely, through the sleeve which rotates with the motor power shaft. The operation does not differ otherwise and the differences in structure between the two forms have been indicated.

From the foregoing, it will be obvious that I have provided a device well adapted for its intended purposes and while I have shown and described the present preferred embodiments of the invention, I wish it understood that I am not limited to the details of the disclosure but only in accordance with the appended claims.

Having thus described my invention, what I claim is:

1. In combination with a vehicle having a passenger compartment, a radiator, a motor mounted adjacent said radiator, a sleeve carried by the motor drive shaft and rotatable therewith, said sleeve extending from a point adjacent said radiator toward said motor and partially surrounding the latter, centrifugal fan means carried by said sleeve, and a fresh air conduit extending from a point outside said passenger compartment and terminating adjacent said radiator opposite said sleeve.

2. In combination with a vehicle having a passenger compartment, a radiator, a motor mounted adjacent said radiator, a sleeve carried by the motor drive shaft and rotatable therewith, said sleeve extending from a point adjacent said radiator toward said motor, centrifugal fan means carried by said sleeve, housing means cooperating with said sleeve to complete the enclosure of said fan means, a conduit extending from said housing means to a point adjacent said radiator, and a fresh air duct extending from a point outside said passenger compartment and terminating adjacent said radiator on the side opposite said conduit.

3. In a heater for vehicles, a heat exchange device, air circulating means adjacent thereto, means associated with said air circulating means and defining a housing having an inlet and an outlet opening, means for controlling the admission of outside and inside air to said inlet opening, a second air circulating means the same being located outside said housing, for causing air within said vehicle body to circulate in contact with said heat exchange device, and a single means for operating both said air circulating means.

4. In a device of the class described, in combination, a radiator, a fresh air duct terminating in a plurality of outlets adjacent one face of said radiator, a centrifugal fan having inlets at both ends of the rotor and conduit means extending from points opposite said outlets to the two ends of said fan.

5. In a device of the class described, in combination, a radiator, a fresh air duct terminating in a plurality of outlets adjacent one face of said radiator, a centrifugal fan having inlets at both ends of the rotor and conduit means extending from points opposite said outlets to the two ends of said fan, said outlets being connected in communication with each other by means of relatively narrow conduit means.

6. In a heater for the passenger compartment of an automobile, a radiator, two conduits leading from said radiator to deliver warm air therefrom into said passenger compartment, and a supplemental duct applied to said radiator to deliver air from outside said compartment to said radiator in alignment with one of said conduits.

EDWARD L. MAYO.